INVENTOR.
WALTER R. HEDEMAN JR.

INVENTOR.
WALTER R. HEDEMAN JR.
BY George Sipkin
B. L. Tangaril
ATTORNEYS

Aug. 23, 1960

W. R. HEDEMAN, JR 2,950,476

YAW COMPUTER

Filed March 30, 1955

INVENTOR
WALTER R. HEDEMAN JR.

BY George Sipkin
B. L. Zangwill
ATTORNEYS

United States Patent Office 2,950,476
Patented Aug. 23, 1960

2,950,476

YAW COMPUTER

Walter R. Hedeman, Jr., Dallas, Tex., assignor, by mesne assignments, to the United States of America as represented by the Secretary of the Navy Filed Mar. 30, 1955, Ser. No. 498,120

8 Claims. (Cl. 343—11)

The present invention relates to an instrument landing system for aircraft and more particularly to an aircraft carrier-controlled approach system.

Instrument landing systems have been in use for several years. One such system is the Ground Controlled Approach system (GCA) in which an operator at a radar installation at an airport gives verbal instructions via radio to the pilot of a landing aircraft to cause the aircraft to follow a glide path to the runway. In this system, the radar is installed on the ground which furnishes a firm reference plane for radar location of the aircraft in space, and the runway is also at a fixed location in space. The variables which can therefore affect the glide path of the aircraft are its speed and attitude, wind velocity, and its point of approach to the runway. While the GCA system requires close cooperation between the pilot and the ground operator, the system is entirely operable with well-trained personnel.

However, when the radar installation and the "runway" are mounted on a ship, such as an aircraft carrier, there is no longer a stationary base since the ship itself may be moving in any one or more of the three dimensions. For aircraft landings on the flight deck of an aircraft carrier, it is usual to head the aircraft carrier so that the wind is approximately five degrees off the port bow and to maintain a constant course and speed. However, the course must be changed as the wind shifts, and it is impossible to prevent random unintentional deviations from a desired course, or "yaws," caused by wind, currents and ocean conditions, which are corrected by the helmsman as they occur. Such course changes are of indefinite magnitude and duration. However, course changes by the ship require correction in the glide path of an aircraft landing on the ship.

The radar antennas on the aircraft carrier are stabilized by gyroscopes relative to horizontal horizon, and by the ship and a gyroscopic compass in direction, so that changes in the course, intentional or otherwise, appear to the radar operator as deviations in the position of the aircraft. If corresponding corrections in the glide path are made for yaws, the aircraft will be required to duplicate the unintentional movement of the ship. It is more desirable merely to compensate for the slight lateral movement of the yaws.

The course of a ship, neglecting drift which is usually minor, is the integral of its instantaneous headings, so that integration of the headings over a period of time will substantially eliminate the effect of unintentional course changes. However, such an integration will delay indication of course changes, for which correction should be made as soon as possible in order to prevent the aircraft from arriving at the carrier in a position and/or at an attitude from which a safe landing is difficult or impossible.

The principal object of the present invention is to provide a carrier controlled landing system in which the integrated instantaneous headings are used as a directional reference for the operation of the system, and wherein the directional reference is quickly changed when course changes are made. This system is referred to as a carrier controlled approach, or CCA system.

It is an object of the present invention to provide a carrier based instrument approach system for aircraft using the course of the carrier as its directional reference.

It is a further object of the present invention to provide an instrument approach system for carrier based aircraft which is unaffected by minor unintentional changes in the ship's headings or yaws less than 5°.

It is a still further object of the present invention to provide an instrument approach system for carrier-based aircraft which employs the integrated headings of the carrier as a directional reference.

Further objects and advantages of the present invention will be made apparent to those skilled in the art by reference to the following detailed description taken in connection with the appended drawings wherein like or corresponding parts are indicated by the same reference character and in which—

Figure 1:
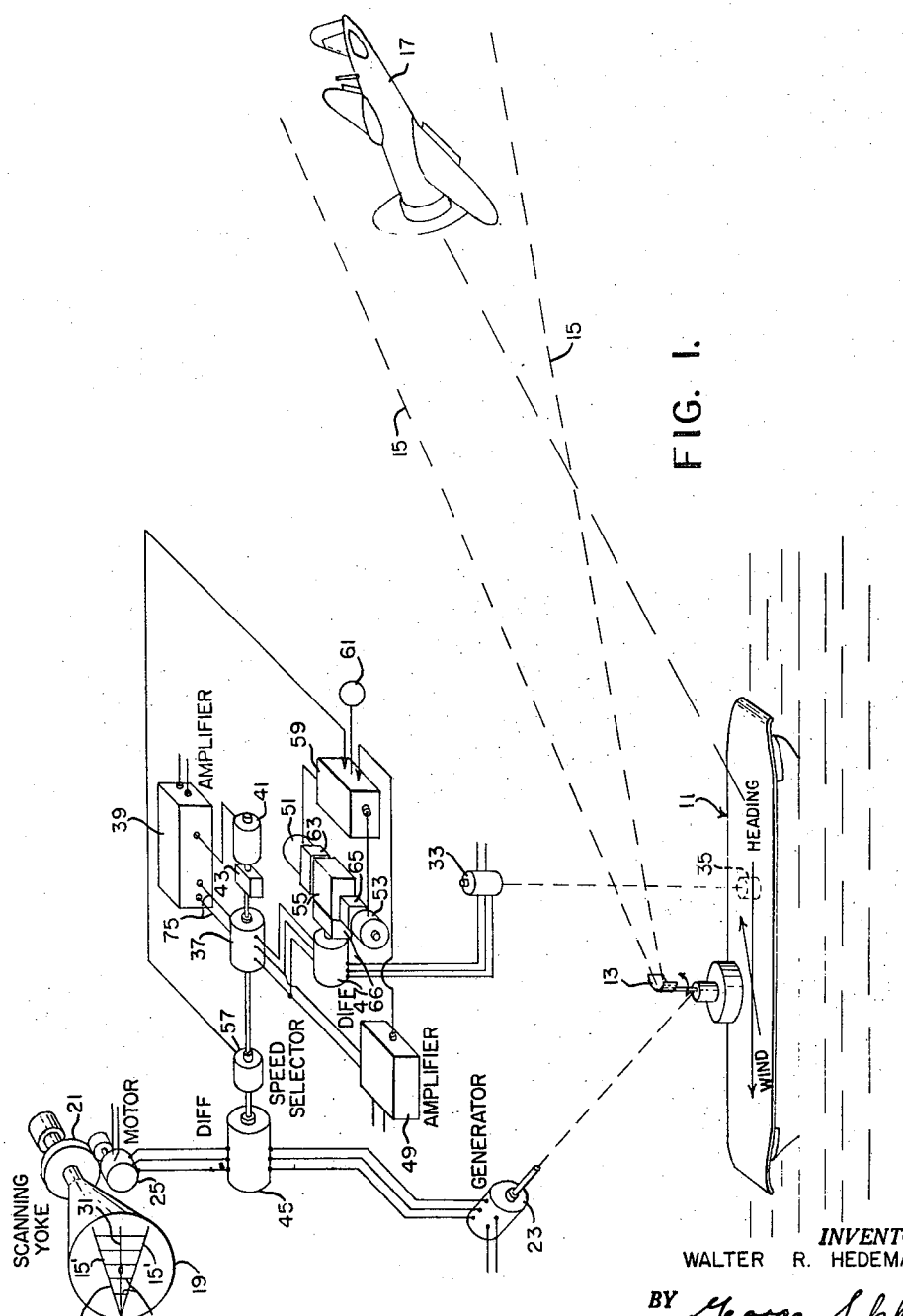
Fig. 1 is a diagrammatical view of an embodiment of the present invention.

Referring now to the drawings, there is shown in Fig. 1 a diagrammatic showing of the present invention as applied to an aircraft carrier 11. Since the radar equipment per se is conventional and not part of the present invention, only such parts of that equipment as are needed for an understanding of the invention are shown. The horizontal antenna 13 is mounted on a stabilized base (not shown) and is driven to oscillate over an arc in the horizontal plane. The directional characteristic of the antenna is preferably sharp in a horizontal plane and broad in a vertical plane. The oscillation of the antenna causes the radar to scan an arc indicated by the dashed lines 15.

The horizontal position of the aircraft 17 relative to the ship 11 is indicated on a cathode ray tube 19 having a deflection means synchronized with the antenna 13. As illustrated herein, this deflection means comprises the deflection yoke 21 which is driven in synchronism with the antenna 13 through the selsyn generator 23 and the selsyn motor 25.

A screen 27 is mounted over the face of the cathode ray tube 19 which may be provided with lines 15' indicating the normal approach area, range lines 29, and a reference line 31 representing the desired glide path. It is necessary to the facile operation of the CCA system that the reference line 31 be maintained in a position representing the track of the aircraft carrier 11, normally horizontal.

It has been found by experience that a qualified helmsman can maintain his heading within a small angle, such as three to five degrees, of his proper course under conditions where aircraft may land on a carrier. For this reason, deviations under a predetermined angle such as five degrees are assumed to be unintentional yaws, and deviations of more than the predetermined angle are assumed to be intentional changes in course.

The heading of the aircraft carrier 11 is reproduced by an azimuth generator 33 connected to the ship's gyrocompass 35, which is preferably of the selsyn type. The signal from the azimuth generator 33 is impressed, through correction means later described, on the yaw corrector transformer 37, which is also preferably of the selsyn type, where it provides a control signal for the servo-amplifier 39. The servo-amplifier 39 may be of any desired type and energizes the yaw corrector servo-motor 41 which is mechanically connected to the yaw corrector transformer 37 through the gear box 43. Operation of the yaw corrector servo-motor 41 shifts the yaw corrector transformer 37 in a direction and magnitude of movement to duplicate the motion imparted to the azimuth generator 33 by the compass 35.

A yaw corrector differential 45, preferably of the selsyn type, is interposed between the selsyn generator 23 and the selsyn motor 25 to modify the angular relationship therebetween. The yaw corrector differential 45 is driven by the same shaft as the yaw corrector transformer 37. Operation of the yaw corrector servo-motor 41 therefore serves to maintain the reference marker 31 in a constant relation relative to the earth, independently of the ship 11 for small amplitudes of yaw of less than 5 degrees. Thus the ship is allowed to turn without affecting the indication on the cathode ray tube 19.

In order to correlate the radar system with the track of the ship, the direct angular relationship between the position of the azimuth generator 33 and the position of the yaw corrector transformer 37 is made variable by means of the course correction means comprising course correction differential 47. Rotation of the course correction differential 47 sets into the system the effect of a rotation of the azimuth generator 33, and produces a corresponding reaction by the servo-motor 41.

In the course correction differential 47, the voltage on any one phase of the secondary passes through zero and reverses in phase at a particular angular position, or balance point. This characteristic may be used to provide a signal to control a servo-motor independently of its function as a differential. In the present invention, the voltage appearing on one phase of the course correction differential 47 is impressed on the course correction servo-amplifier 49 which energizes one or the other of course correction servo-motors 51 or 53. The servo-motors 51 and 53 operate at different speeds for purposes later to be described to rotate the rotor of the course correction differential 47 toward its balance point. In doing so, there is produced a voltage at the yaw corrector transformer 37 which results in the yaw corrector servo-motor 41 driving the yaw corrector transformer 37 and yaw corrector differential 45 to a corresponding position, thus maintaining reference marker 31 in its normal position.

Course correction servo-motor 51 is arranged to drive the course correction differential 47 very slowly, and is hereinafter called the slow course correction servo-motor. For example, since experience has shown that a yaw has a duration of approximately fifteen seconds and an amplitude of less than five degrees, the slow course correction servo-motor 51 is arranged to drive the course correction generator 47 through an angle of about five degrees per minute. The operation of the slow course correction servo-motor 51 thus cannot follow large yaw movements and assumes a position corresponding to the average course or track of the ship. As the course correction differential 47 is shifted, the yaw corrector transformer 37 appears to be shifted in the opposite direction, as seen by the yaw corrector servo-amplifier 39.

The angular position of the rotor with respect to the frame of corrector differential is at any time a measure of the difference between the averaged course or track of the ship and the instantaneous heading thereof. As previously mentioned, if the difference between the track and the heading is below a small angle, such as five degrees, it is considered to be a yaw and the slow course correction servo-motor 51 operates to integrate it into the track of the ship. However, if the deviation from the track is larger than the small angle, it is presumed to be an intentional change in course.

The course correction servo-motor 53 is arranged to drive the course correction differential 47 at a speed at least as fast as the turning rate of the ship 11. Thus, this servo-motor is designated herein as the fast course correction servo-motor 53, and operates to promptly correct the system when an intentional course change occurs.

For convenience, the course correction servo-motors 51 and 53 may be connected to the course correction differential 47 through a mechanical differential 55. This arrangement allows two motors to be connected to a single load without clutches, but it will be obvious that any other suitable means may also be employed if desired.

A speed selector 57 is driven by the servo-motor 41 together with the yaw corrector differential 45, and provides a changeover signal which acts through a relay means 59 to energize the fast correction servo-motor 53 and de-energize the slow correction servo-motor 51 when the yaw correction at the differential 45 exceeds a predetermined angle, as previously mentioned.

At the same time, a change-course signal or alarm, such as the lamp 61, is energized to appraise the operator of the change in course. The operator may then give to the aircraft such instructions as are necessary to effect a landing on the landing on the new course.

As an example of a specific embodiment of the present invention, the slow correction servo-motor 51 is connected to the course correction differential 47 through a speed-reducing gear box 63 having a high ratio, such as 1400 to 1, which provides the required slow response. However, the fast correction servo-motor 53 is connected through a gear box 65 having a much lower ratio, such as 35 to 1. The differential 55 is connected to the course correction differential 47 through a gear box 66 having a ratio of 50 to 1.

Figure 2:
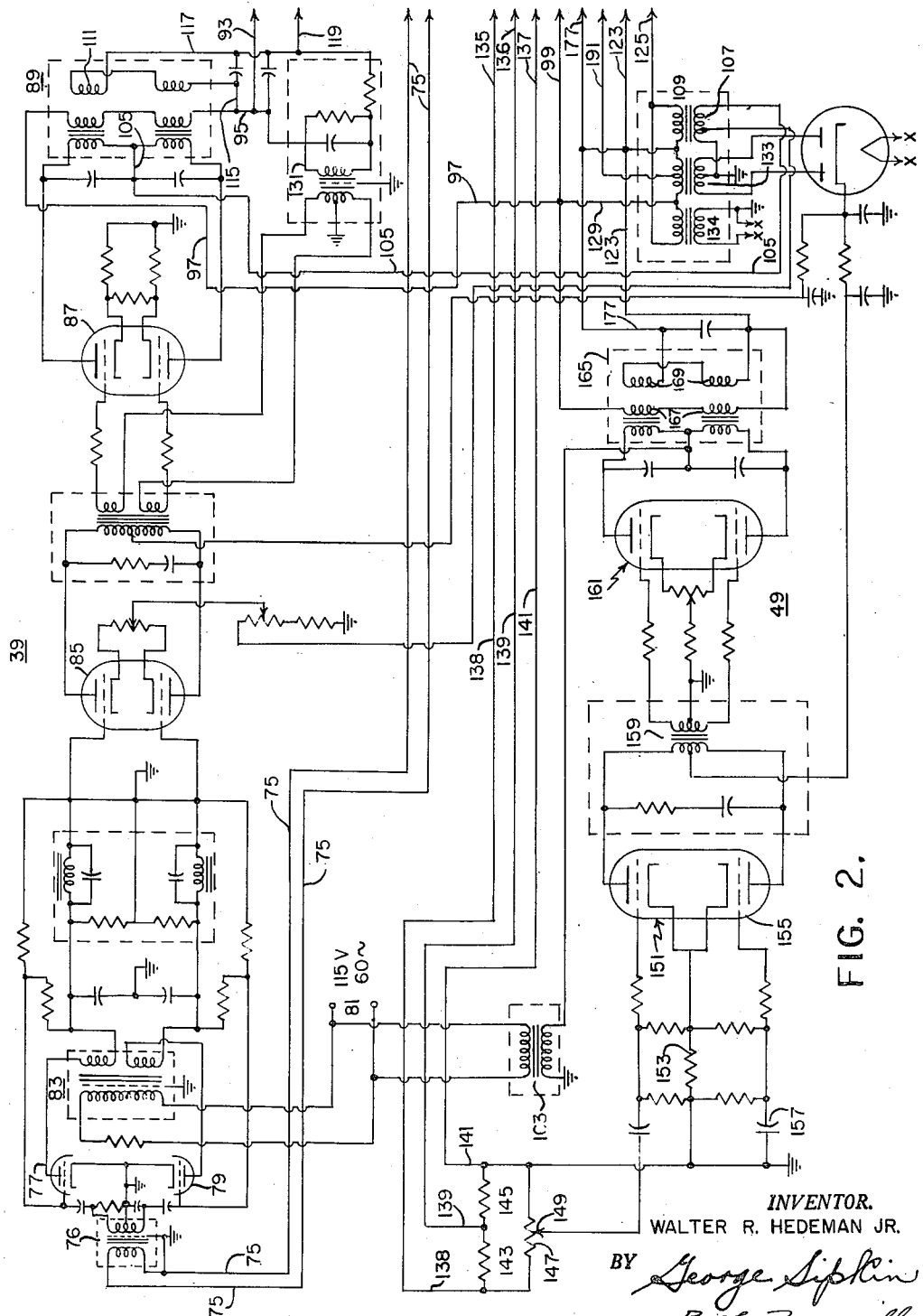
Figs. 2 and 3 are to be connected together at correspondingly numbered conductors, and are a schematic circuit diagram usable in the present invention.
Figure 3:
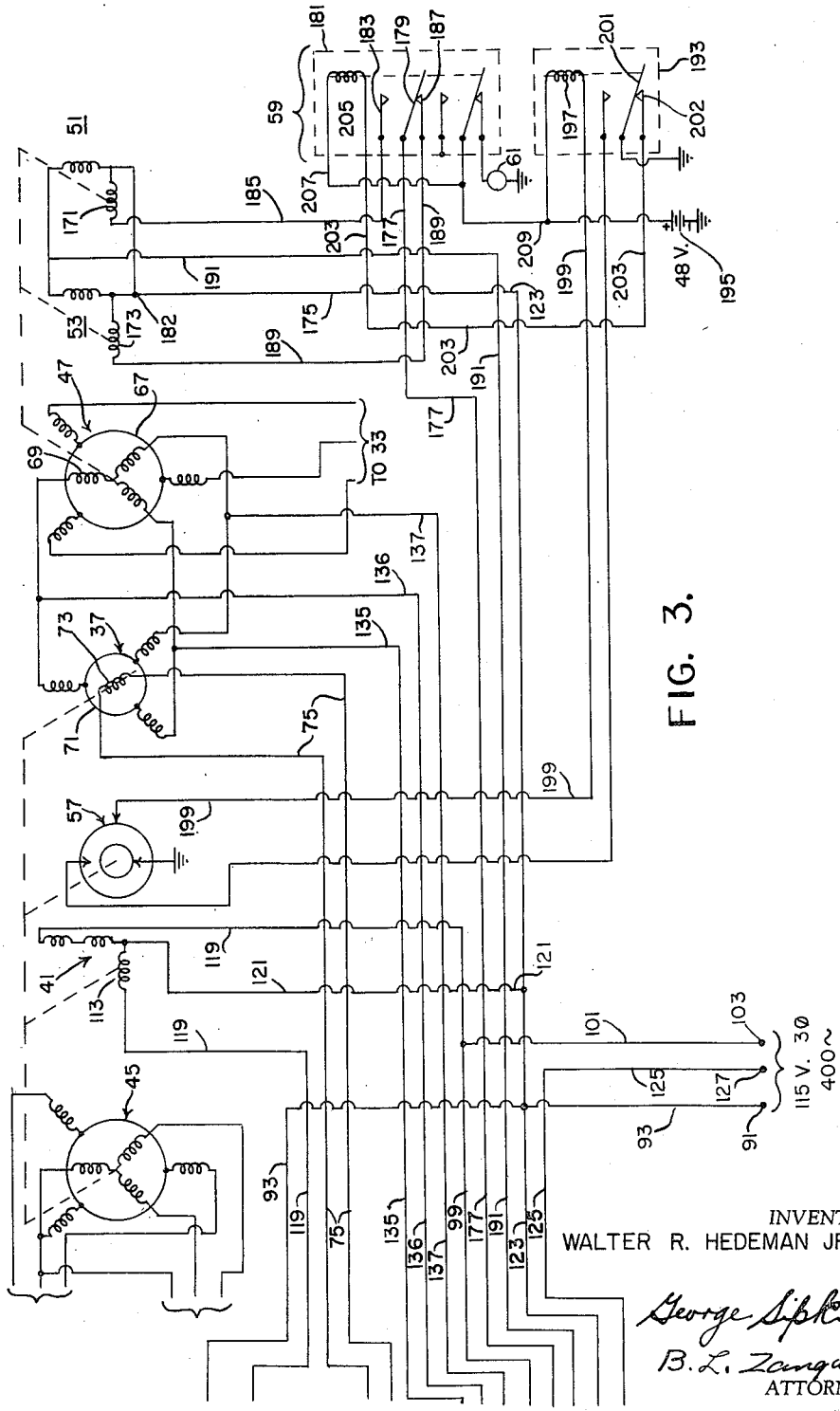

Suitable servo-amplifiers and control units are shown in Figs. 2 and 3. The several selsyn motors and generators are powered by a sixty-cycle alternating current source while the servo-motors and the servo-amplifiers are operated from a 400-cycle three-phase source.

The servo-motors 41, 51, and 53 are each of the two-phase induction motor type, wherein a power winding is normally energized from a source of alternating current and a control winding is energized from a second source of alternating curent in quadrature phase relationship to the first. If the polarity of the control winding is reversed, the direction of rotation of the motor reverses, and the speed of rotation varies with the potential applied to the control winding.

The stator 67 (Fig. 3) of the course correction differential 47 is connected to the stator of the azimuth generator 33, and receives therefrom a signal, which is induced in the rotor 69 of differential 47. The rotor 69 is in turn connected to the stator 71 of the yaw corrector transformer 37, and the rotor 73 thereof is connected to the inut of yaw corrector servo amplifier 39 (Fig. 2) by wires 75.

The input of yaw correction servo-amplifier 39 comprises a push-pull input transformer 76 driving a phase discriminator comprising a pair of triodes 77 and 79. The anode circuits of the triodes are energized from a source of sixty cycle alternating current from the terminals 81 through the transformer 83 having individualized secondary windings. The output signal from the triodes 77 and 79 is therefore an alternating current voltage having a phase determined by the direction in which the course corrector differential 47 shifted in response to the azimuth generator 33, and having a magnitude proportion to the shift. This output signal voltage is amplified in the double triode 85 and is impressed on a control stage comprising the double triode 87 which controls a magnetic amplifier 89.

The magnetic amplifier 89 is energized from the 400 cycle power source by a circuit extending from power terminal 91 (lower left corner, Fig. 3) via wires 93, 95, 97, 99, and 101 to power terminal 103.

The voltage appearing at the secondary 111 of magnetic amplifier 89 will depend in phase and magnitude upon the phase of the voltage applied to the input transformer 76, and is impressed on the control winding 113 of the yaw corrector servo-motor 41. The circuit extends from an end of winding 113 of servo-motor 41 (Fig. 3) through wire 119, wire 117, (Fig. 2) winding 111, wire 115, wire 95, wire 93, and wire 121 to the other end of winding 113.

The anode circuit of the control tube 87 for the magnetic amplifier is energized through wire 105 from secondary 107 of a three-phase transformer 109. The grid circuit of control tube 87 has connected thereto a transformer 131 and associated resistor-capacitor network, connected to the magnetic amplifier 89, which serve to induce a feed-back voltage into the grid circuit. The servo-motor 41 is therefore caused to respond quickly to an input signal without overrunning. The power winding of servo-motor 41 is connected across power terminals 91 and 103 by wires 93, 123, 121, 119, and 101.

The primary of three phase transformer 109 is delta-connected and has one primary terminal connected by wire 125 to terminal 127. A second terminal of the transformer is connected to terminal 91 via wires 93 and 123, and the third terminal is connected to terminal 103 via wires 129, 99, and 101. Secondary winding 133 feeds through a conventional rectifier and filter circuit for supplying direct current. Secondary winding 134 supplies filament power for the several tubes.

The rotor 69 (Fig. 3) of the course correction differential 47 is connected by wires 135, 136, and 137 to the input of servo-amplifier 49 (Fig. 2) through wires 138, 139 and 141 connected to resistors 143, 145, and 147 which provide equal loading on the several phases. The resistor 147 is provided with an adjustable slider 149 which controls the sensitivity of the servo-amplifier.

A portion of the voltage appearing across resistor 147 as determined by the slider 149 is applied as an input to the control grid of one half of double triode tube 151 of amplifier 49; and the conduction of the tube through cathode resistor 153 serves to provide an equal and opposite signal at the cathode of the other half of the tube. The control grid 155 of this other half of tube 151 is grounded through capacitor 157. The output voltage of the input stage is therefore an amplified version of the voltage appearing between lines 138 and 141, and hence of a phase of the course correction differential 47.

The output signal from double triode 151 is impressed through transformer 159 on the control grids of the phase discriminator tube 161, the anodes being energized from transformer 163 connected to power terminals 81. The output of the phase discriminator tube 161 controls a magnetic amplifier 165. The magnetic amplifier 165 has a power winding 167 connected between wires 123 and 99 leading to power terminals 91 and 103. The output winding 169 of the magnetic amplifier is connected to the control windings 171 and 173 of the course correction servomotors 51 and 53, the connections including a contact arm 179 of transfer relay 181 in relay means 59. The connections are as follows: wire 123, wire 175 to junction 182. Then from junction 182 either through winding 171, wire 185, to normally open contact 183 for contact arm 179 or through winding 173, wire 189 to closed contact 187 for contact arm 179.

The power windings of course correction servo-motors 51 and 53 are connected in parallel with each other. The parallel branch is connected to an end of a winding of transformer 109 via junction point 182, wires 175, and 123, and to the center-tap of this winding transformer 109, via wire 191 which provides the required 90° phase shift.

The speed selector 57 is driven by the yaw corrector servo-motor 41 and acts as a contactor to control a relay 193 of relay means 59. The control relay 193 is actuated when the speed selector 57 is within its normal angular range, and opens the actuating circuit of transfer relay 181 by a circuit extending from ground through the battery 195, actuating coil 197 of relay 193, and wire 199 to the speed selector 57 and thence to ground. A contact arm 201 of relay 193 is grounded and the normally closed contact 202 cooperating therewith is connected by wire 203 to the actuating coil 205 of transfer relay 181. The remaining terminal of the actuating coil 205 is connected to battery 195 by wires 207 and 209.

Figure 4:
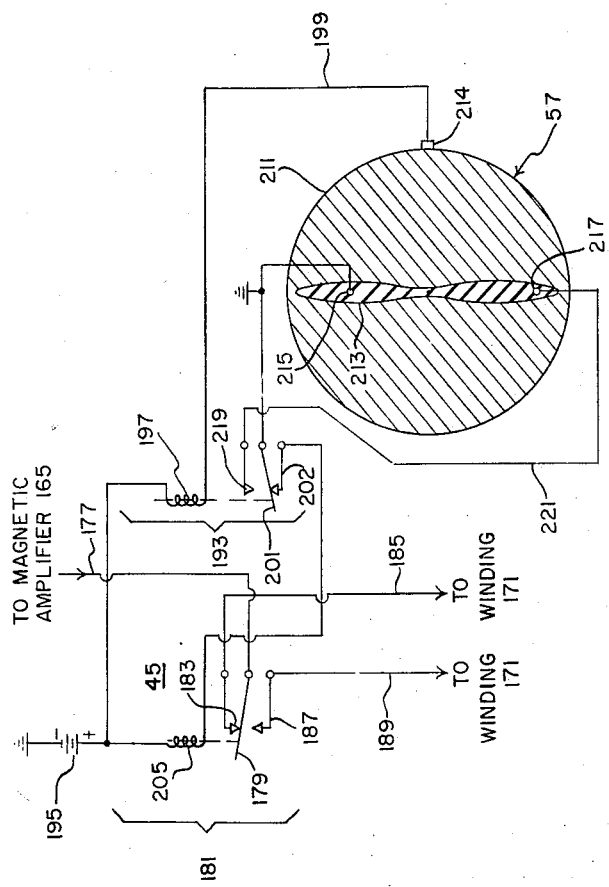
Fig. 4 is a diagrammatic showing of a selector switch usable with the present invention.

The operation of the speed selector 57 and the relay may be most easily understood by reference to Fig. 4. A disc 211 of the selector is of conductive material and contains the nonconductive segment 213 of radially varying arcuate width. A collector brush 214 for the disc is connected to the actuating coil 197 of relay 193 by wire 199. Two oppositely positioned brushes, 215 and 217, are positioned to bear on the surface of the disc. Normally, the brushes 215 and 217 are located on the non-conductive segment.

Brush 215 is connected to ground as is contact arm 201, the brush being positioned to provide a non-conductive position having an arcuate dimension of about ±5° from the mean location shown in Fig. 4. The control relay 193 is therefore normally de-energized. Contact arm 201 engages contact 202 completing a circuit to coil 205 of transfer relay 181. Arm 179 on transfer relay 181 is in position to connect wire 177 from magnetic amplifier 165 to control winding 171 of the slow speed course corrector motor 51, via contact 183 and wire 185.

Brush 217 is normally positioned on the non-conductive segment 213 in a radial position to allow an arcuate movement of about ±2° thereon, and serves as a latching contact for control relay 193 to prevent undesirable operation thereof by maintaining the control relay actuated until the disc 211 is returned to within 2° of neutral.

If the disc is rotated over five degrees, brush 215 contacts the conductive portions of the disc to actuate control relay 193 and thus de-energize transfer relay 181. The fast course corrector motor is thus energized by the now closed contact 187 and wire 189. At the same time, brush 217 engages the disc and thereby connects wire 221, to ground through contact 219 and arm 201. Thus, as the disc 211 is driven toward its neutral position, brush 215 moves to the non-conductive segment 213 before the brush 217, but the control relay 193 remains energized until the brush 217 is also positioned on the non-conductive segment 213.

The brushes 215 and 217 are preferably made adjustable in a radial direction, and the non-conductive segment 213 is made with a varying arcuate width to provide an adjustment of the angular deviations controlling the relay 193. By means of these adjustments, the CCA installation may be correlated with the particular ship and its normal operation.

In operation of the CCA system, the carrier is placed on a course with the wind approximately 5° off the port bow, and the helmsman endeavors to maintain that course within as close limits as possible. The radar operator contacts the aircraft by radio, giving him course, speed and rate of descent. Yaws are automatically corrected by the operation of yaw corrector motor 41 through the yaw corrector differential 45. However, the headings of the ship are continuously integrated by the slow course corrector motor 51 and the course corrector differential 47. The radar operator continues to follow the position of the aircraft 11 on his indicators, and directs any changes as may be necessary to bring the aircraft to the carrier in a correct position for landing.

Should a change in the ship's course be required, the yaw corrector differential 45 will be driven to such an extent that the speed selector 57 acts through the relay 59 to energize the fast course corrector motor 53 which immediately returns the yaw corrector differential 47 to a neutral position, and lighting the change course lamp 61. The system then reverts to normal operation, using the slow speed course correction motor 51 to integrate the new course. Corrective instructions are then radioed to the aircraft, and the operation continued until a landing is made.

While only a single embodiment of the present invention has been described in detail herein, it will be apparent to those skilled in the art that many modifications and changes in the apparatus are possible without departing from the spirit thereof, and it is desired to cover all such embodiments as fall within the scope of the appended claims.

I claim:

1. In a radar system for use on an aircraft carrier, a driven horizontal scanning antenna, a direction indicator, means maintaining said antenna and indicator in an adjustable correlation comprising an adjustable differential connection between the antenna and the indicator, for maintaining said correlation, first servo-motor means connected to said differential connection, means for producing an azimuth signal proportional to the instantaneous heading of the ship, means for impressing said azimuth signal on said first servo-motor means for controlling said first servo-motor means responsive to said azimuth signal and thereby to adjust said differential connection, second servo-motor means connected to receive said azimuth signal, and modifying means driven by said second servo-motor means for integrating said azimuth signal over a time period and operable on said differential connection, whereby to stabilize the direction indicator.

2. A system for providing a stabilized directional reference for a ship borne radar system comprising, a driven horizontal scanning antenna, a synchronously driven direction indicator, a selsyn generator and motor and connection means therebetween to correlate said antenna and indicator, said connection means including an adjustable first differential means to control the phase relationship thereof between said generator and motor, first servo-motor means for adjusting said first differential means, azimuth means for producing an azimuth indication proportional to the instantaneous heading of the ship, a second differential means having one input connected to said azimuth means, second servo-motor means having a response slow with respect to directional movements of the ship, and means for impressing the output of said second differential means on said first and second servo-motor means, said first and second servo-motor means controlling said first differential means.

3. The apparatus as claimed in claim 2 further characterized by angular deviation means synchronously operated by said first differential means to produce an indication when said first differential is operated through more than a predetermined angle, motor means connected with said second servo-motor means having a response time comparable to the directional movements of the ship, and means for connecting said motor means to said angular deviation means, whereby to correct said directional indicator for course changes of the ship.

4. A device for providing a directional reference for a ship-borne radar system comprising, a driven horizontal scanning antenna, cathode ray tube indicator and deflection means therefor, the antenna and the deflection means being interconnected by a selsyn system comprising a first selsyn differential having its electrical inputs interposed between the antenna and the deflection means, a selsyn generator producing an azimuth signal, a second selsyn differential having one electrical input connected to said selsyn generator, a selsyn transformer connected to the electrical output of said second selsyn differential, servo-motor means mechanically driving said first selsyn differential and said selsyn transformer, said servo-motor means including a first servo-amplifier responsive to said selsyn transformer, first motor means having a response speed slow with respect to deviational movement of the ship, second motor means having a response comparable with directional movements of the ship, said first and second motor means being mechanically connected to said second selsyn differential, second servo-amplifier means responsive to the azimuth signal appearing at said electrical output of said second selsyn differential, relay means selectively interconnecting said first and second motor means and the output of said second servo-amplifier, angular deviation means operated by said servo-motor to produce a signal when said first selsyn generator is rotated more than a predetermined angle, and means for impressing the signal from said angular deviation means on said relay, whereby to correct angular displacement of the first selsyn differential exceeding said predetermined angle.

5. The device as claimed in claim 4 but further characterized by means included in said angular deviation means to maintain said relay actuated until the deviation is reduced to a second predetermined angular displacement, said second predetermined angular displacement being smaller than the before-mentioned predetermined angular displacement.

6. A carrier controlled approach system for a ship comprising a radar scanning device, an indicator means for displaying the position of a rapidly moving object relative to said ship, a compass, and an integrating control means connected between said device, said indicator, and said compass for synchronizing said device with said indicator means whereby the position of said object may be displayed relative to the average heading of said ship.

7. A carrier controlled approach system for a ship according to claim 6 but further characterized by said control means also including means for rapidly changing the orientation of said device and said indicator means in synchronism in response to angles of yaw greater than 5° of said ship.

8. A carrier controlled approach system according to claim 7 but further characterized by said control means including an alarm operable by said last named means.

References Cited in the file of this patent

UNITED STATES PATENTS 2,742,637   Braddon et al. _____ Apr. 17, 1956